July 23, 1963
G. A. WALLACE ETAL
3,098,542
SAFETY LATCH ARRANGEMENT
Filed Sept. 13, 1961
3 Sheets-Sheet 2
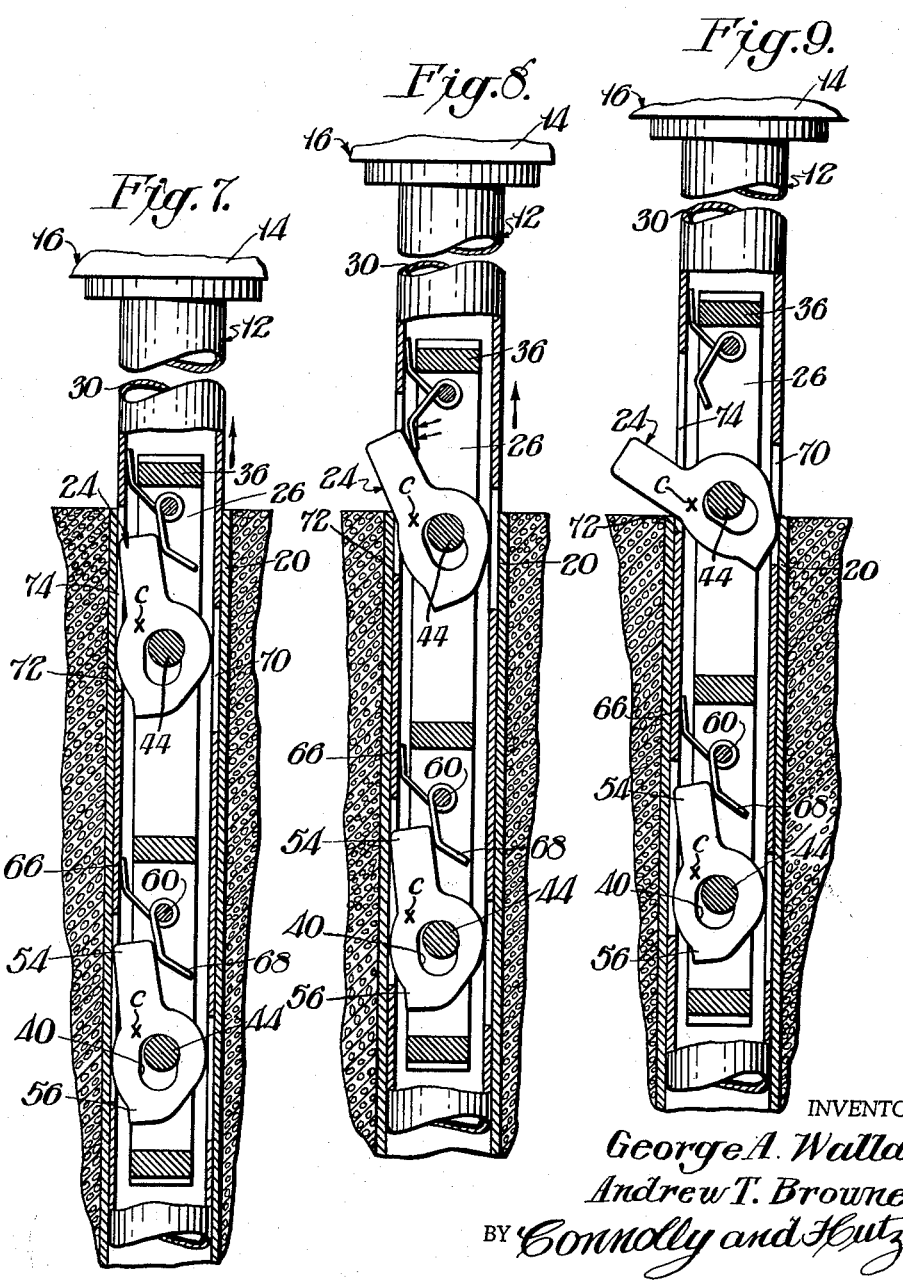
INVENTORS
George A. Wallace
Andrew T. Browne
BY Connolly and Hutz
ATTORNEYS July 23, 1963
G. A. WALLACE ETAL
3,098,542
SAFETY LATCH ARRANGEMENT
Filed Sept. 13, 1961
3 Sheets-Sheet 3
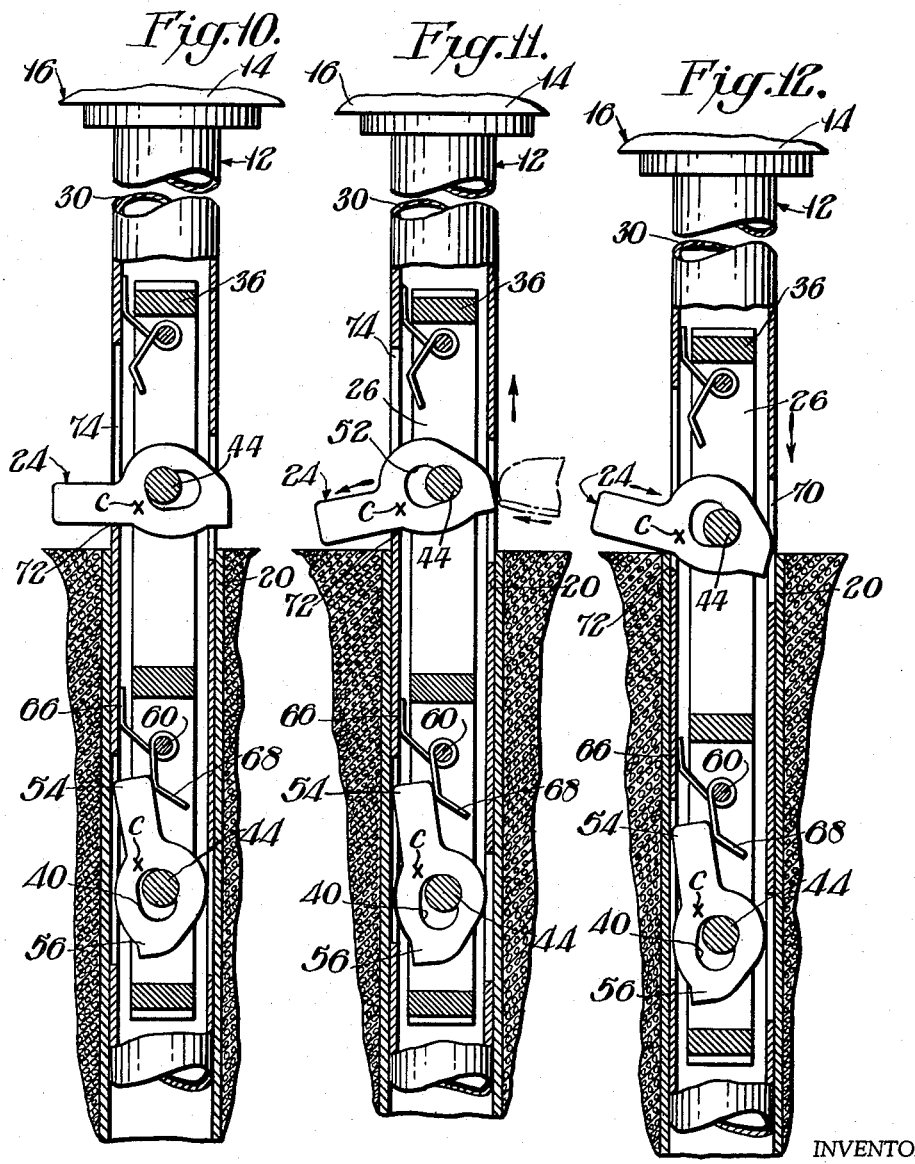
INVENTORS
George A. Wallace
Andrew T. Browne
BY Connolly and Hutz
ATTORNEYS United States Patent Office 3,098,542
Patented July 23, 1963

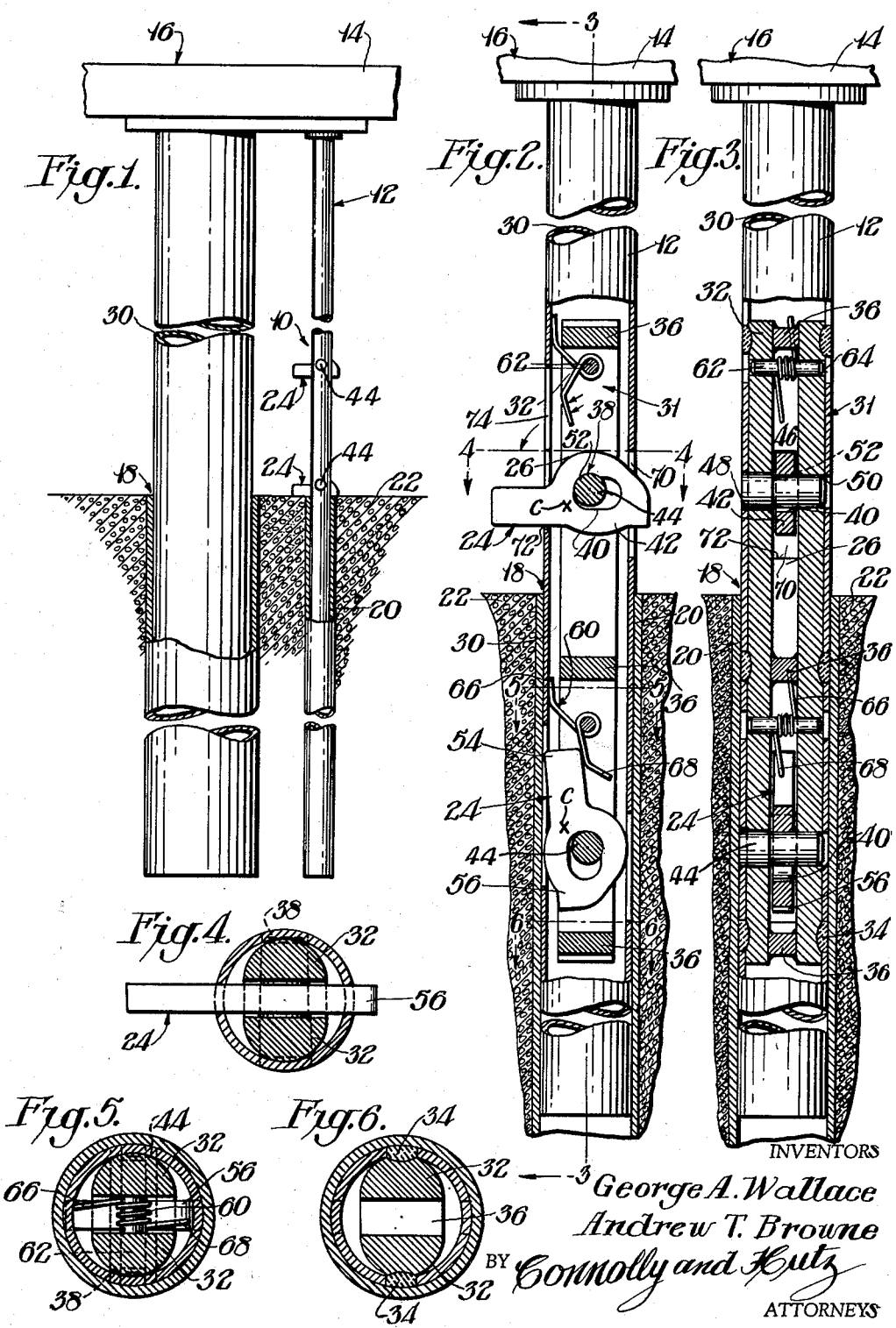

3,098,542
SAFETY LATCH ARRANGEMENT
George A. Wallace, Philadelphia, and Andrew T. Browne, Springfield, Pa., assignors to Globe Hoist Company, Philadelphia, Pa., a corporation of Maryland
Filed Sept. 13, 1961, Ser. No. 137,916
10 Claims. (Cl. 187—8.49)

This invention relates to a safety latch arrangement for a lifting apparatus, and it more particularly relates to such an arrangement for an automobile hoist.

Various types of safety legs and latches are in widespread use for preventing the accidental fall of automobile hoists should a failure, such as loss of hydraulic pressure, occur while in service. These safety latching arrangements should be simple, rugged, durable and economical in construction yet dependable in operation. It has been found quite difficult to provide an arrangement which simultaneously satisfies all of these rigorous conditions.

An object of this invention is to provide a safety latch arrangement for a lift which is simple, rugged, durable, economical to manufacture assemble and maintain and dependable in operation.

In accordance with this invention a latching bar is mounted to rotate between a substantially vertical stored position and substantially horizontal position within a slot in the elongated piston of a safety leg. It includes opposite storing and releasing ends, and its rotation is obtained by a slotted hole and shaft means extended in the direction of its length to permit it to be shifted to transverse locking and storing positions. When the latching bar rises out of the upper end of the safety leg tube and is horizontally disposed, its storing end is long enough to overhang the upper end of the tube in all transverse positions. However, the releasing end is only long enough to overhang the upper end of the tube when the latching bar is shifted into the transverse locking position in which it is fully extended.

During normal operation of the lift in the absence of failure, the latching bar is automatically and positively resiliently urged to rotatably drop from the substantially vertically stored position within the piston to a substantially horizontal locking position every time that it rises above the safety leg tube. Should the hoist fail, its downward movement is arrested by the overhanging contact of the storing and releasing ends of the latch upon the upper end of the safety leg tube. However, when it is desired to lower the hoist, the latching bar must be shifted from the transverse locking to the transverse releasing position, for example, by kicking the releasing end toward the piston. Since the releasing end no longer overhangs the tube in the transverse releasing position, the downward movement of the storing end against the upper end of the tube rotates the latch into the vertical stored position within the piston as the latching bar drops within the tube with its storing end disposed above its releasing end. As the bar assumes the substantially vertical stored position, its weight reacts in a direction to help it shift to the transverse locking position thereby conditioning it for overhanging the tube when it again moves out of the tube and drops to a horizontal disposition. The means which resiliently biases the latching bar to rotate into the horizontal positions also react against the latching bar in a direction to maintain it in the transverse locking position while it is vertically stored within the cylinder.

Novel features and advantages of the present invention will become apparent to one skilled in the art from a reading of the following description in conjunction with the accompanying drawings wherein similar reference characters refer to similar parts and in which:

FIG. 1 is a view in elevation partially broken away in cross section of one embodiment of this invention connected to a fragmentarily represented vehicle lift;

FIG. 2 is an enlarged view partially broken away in cross section of the safety latch arrangement shown in FIG. 1;

FIGS. 3–6 are cross-sectional views taken through FIG. 2 along respective lines;

FIGS. 7–10 are cross-sectional views of the safety latch arrangement shown in FIG. 2 in successive phases of operation as the safety leg piston rises from within the safety leg tube;

FIG. 11 is a view similar to FIG. 10 illustrating how the latching bar is transversely shifted from the locking to the releasing position to allow lowering of the lift; and FIG. 12 is a cross-sectional view of the safety latch arrangement shown in FIG. 11 as the safety leg piston and latch are being reinserted within the safety leg tube upon downward movement of the lift.

In FIG. 1 is shown a safety latch arrangement 10 including an elongated safety leg piston 12 whose upper end is connected to superstructure 14 of a fragmentarily represented vehicle lift 16 which is supported upon hydraulic piston and cylinder assembly 18. The lower end of elongated safety leg piston 12 is inserted within elongated safety leg tube 20 which is vertically installed in the ground 22 adjacent hydraulic cylinder and piston assembly 18. A pair of latching bars 24 are mounted to rotate within slots 26 (shown in FIG. 3) in the safety leg piston 12 upon shafts 44. Latching bars 24 provide two different latching levels depending upon the height to which superstructure 16 is raised, and in FIG. 1 they are shown in the condition in which the fall of vehicle lift 16 has been arrested by engagement of lower latching bar 24 with the upper end of tube 20 and/or the ground. Details of the construction of this safety latch arrangement and its operation are described in the following which is in the most part directed to only one of the two illustrated latches because they are identical.

In FIGS. 2–6 is shown the structure of elongated safety leg piston 12 which is fabricated from a elongated section of steel tubing 30 reinforced by an internal box assembly 31 including a pair of spaced parallel vertical bars 32 which are secured within tubing 30 by pin welds 34. Box assembly 31 also includes spacing bars 36 welded between parallel bars 32 for supporting them rigidly apart at a distance which provides slots 26 within which latching bars 24 are movably mounted.

Latching bar 24 is mounted to rotate and shift transversely within slot 26 by a slotted hole and shaft means 38 extended in the direction of the length of latching bar 24. A slotted hole 40 is accordingly provided in the boss 42 of latching bar 24, and a shaft or pin 44 is mounted substantially horizontally through slot 26 in piston 12 by removably snugly inserting it through holes 46 in vertical parallel bars 32. A pair of holes 48 and 50 are provided in tubing 30 in line with pin 46 to facilitate its insertion and removal. All parts are for example made of suitable forms of steel for strength and durability.

Slotted hole 40 in latching bar 24, shown in FIG. 2, includes a portion or lobe 52 which extends above the remainder of slotted hole 40 when bar 24 is in a horizontal position for retaining pin 44 to insure that bar 24 remains in the transverse locking position illustrated in FIG. 2 each time that it rises above the upper end of tube 20 until it is deliberately shifted out of it to the releasing position which is later described.

The lower latch 24 shown in FIG. 2 in the stored position is substantially vertically disposed in the transverse locking position, and its relatively longer storing end 54 is disposed above its relatively short releasing end 56. These ends are substantially aligned with each other along an axis substantially parallel to that of the direction of extension of slotted hole 40; and, as shown in the position of the upper latch in FIG. 2, they are disposed along the lower side of latching bar 24 when it is in the horizontal position. This disposition maintains them in locking readiness when horizontal, and maintains the center of gravity "C" of latching bar 24 oriented toward its direction of rotation from the vertically stored position to the horizontal position.

A resilient means 60 reacts between piston 12 and latching bar 24 in a direction which biases it to rotate out of the piston into the horizontal position when it rises above the upper end of tube 20. Although the aforementioned biasing influence of the center of gravity of latching bar 24 would usually be sufficient to drop it to the horizontal position upon emergence from tube 20, the influence of resilient means 60 upon the vertical extremity of travel of bar 24 insures that it drops to the horizontal position every time that the lift rises. This insures proper operation of the safety device even if the mechanism becomes clogged with grease and dirt which is not unusual at auto service stations.

Resilient means 60 is, for example, a torsion spring mounted upon a removable pin 62 secured in bars 32 with access to its ends provided by holes 64 in tubing 30. One leg 66 of torsion spring 60 reacts against the storing end 64 of latching bar 24 when it is forced within slot 26 by insertion of piston 12 within tube 20 as is later described in detail. Spring leg 68 also reacts against latching bar 24 in a direction to help maintain it in the transverse locking position shown in FIG. 2. Although such a spring can be made extremely dependable and durable, it is remotely possible that it could fail. However, the gravity biasing of the latching bar can allow it to operate properly even without spring 60; and the removable maintaining of spring 60 makes it easily replaceable.

FIGS. 7–10 show the sequence of events as upper latching bar 24 emerges from tube 20 in response to upward movement of lift 16 to which it is attached. The ultimate horizontal and transverse locking position is shown in FIG. 10. Lower latching bar 24 remains in the inserted stored position throughout FIGS. 7–10 because lift 16 has not been raised high enough to permit it to emerge from tube 20 and assume the locking position. As shown in FIGS. 7–10 spring 60 reacting against storing end 54 and the unbalanced center of gravity of latching bar 24 urge to rotate to the horizontal position overhanging outside of slot 26 and piston 12 as soon as slot 26 has sufficiently emerged from the upper end of tube 20 as shown in FIG. 8.

Releasing end 56 is short enough and the portion of slot 26 provided by slotted aperture 70 in tubing 30 is extended enough to provide sufficient clearance for releasing end 56 to clear the upper end of tube 20 when latching bar 24 is rotated from the vertical stored position to the horizontal position through the angular orientations shown in FIGS. 8–10 even though latching bar is maintained in the transverse locking position with lobe 52 of slotted hole 40 engaged with piston 44 and releasing end 56 accordingly extended.

FIG. 10 illustrates the horizontal transverse locking condition of latching bar 24 that it assumes every time that latching bar 24 moves up out of tube 20 by virtue of the resilient reaction of spring 60 and the unbalanced disposition of the center of gravity of latching bar 24. The lower edge 72 of slotted aperture 74 in tubing 30 arrests the downward movement of storing end 54 of latching bar 24 to maintain bar 24 in the horizontal locking position if vehicle lift 16 should fail and start to drop. If no failure occurs to drop latching bar 24 to the position shown by lower latching bar 24 in FIG. 1, it will remain spaced at a distance above the upper end of tube 20 and ground 22 in readiness for release.

FIG. 11 shows latching bar 24 being shifted transversely from the transverse locking position to the transverse releasing position, for example, by kicking releasing end 56 inwardly towards pin 44 which shifts the engagement of pin 44 out of lobe 52. This disposes the end of releasing end 56 within slot 26 and tube 20, which permits the downward motion of storing end 54 against tube 20 when piston 12 descends, as shown in FIG. 12, to rotate latching bar 24 toward the substantially vertical stored position. As latching bar 24 rotates toward the stored position, it starts to shift transversely towards the transverse locking position which it assumes during its downward travel as illustrated by viewing FIGS. 7–9 in the reverse order. This illustrates the sequence of events during storing of the latch instead of emergence as is illustrated in viewing FIGS. 7–9 in the forward order.

Finally, when latch 24 engages torsion spring 60 as shown in FIGS. 8 and 7, torsion spring 60 also helps maintain latching bar 24 in the transverse locking position as it is tensioned. Spring 60 accordingly insures that the gravity biased aspects of this latching arrangement are always augmented and backed up to work positively in every instance as long as spring 60 is operative, which can be dependably checked and maintained with ease. This latching arrangement will, therefore, work positively every time its lift is raised no matter how greasy or dirty the parts may become.

If lift 16 should fail to drop latching bar 24 from the locking position shown in FIG. 10 to the locked position shown in FIG. 1, latch 24 cannot be released until the lift is once more operated to lift latch 24 out of overhanging engagement with the top of tube 20. This insures that the latch cannot be disengaged after it is operated until the lift is once more made operative. Furthermore, the protected condition of latch 24 when it is locked under piston 12 and against ground 22 discourages and prevents it from becoming damaged by any attempts to hammer it out of engagement while it is supporting an inoperative lift.

What is claimed is:

1. A safety latch arrangement for a lift having a superstructure comprising an elongated tube having an open upper end for substantially vertical installation in the ground adjacent said lift, an elongated piston inserted to slide up and down into and out of said open upper end of said tube when the top of said elongated piston is attached to said superstructure, a portion of said piston being cut out to provide a substantially vertically oriented slot, a latching bar mounted to rotate within said slot between a substantially vertical stored position and a substantially horizontal locking position, the length of said latching bar being long enough to overhang said upper end of said tube when said latching bar is horizontally oriented, the width of said latching bar being narrow enough to permit said latching bar to be received within said tube when said latching bar is substantially vertically oriented, said latching bar having opposite storing and releasing ends, slotted hole and shaft means extended in the direction of said length and mounting said latching bar upon said piston to rotate and shift transversely within said slot to transverse locking and storing positions, said releasing end being long enough to extend over said upper end of said tube when said latching bar is substantially horizontally disposed and in said transverse locking position, said releasing end being short enough for disposition within said tube in both horizontal and vertical orientations when said latching bar is shifted into said transverse storing position, said storing end being long enough to overhang said upper end of said tube in all substantially horizontal transverse positions for cooperating with said releasing end upon downward movement when said latching bar is respectively in said transverse locking and storing positions for arresting the downward movement of said latching bar upon said upper end of said tube and for rotating said latching bar into said substantially vertical stored position within said tube with said storing end disposed above said releasing end, means for arresting the downward rotation of said storing end of said latching bar to maintain it substantially horizontally oriented when it rises above said upper end of said cylinder, said slot providing sufficient clearance and said releasing end being short enough to permit rotation of said latching bar from said substantially vertical stored transverse locking to said horizontal locking position, the weight of said latching bar reacting in a direction to shift it into said transverse locking position when said latching bar assumes said substantially vertical stored position to permit said latching bar to be rotated into said substantially horizontal and transverse locking position every time that said latching bar moves out of said upper end of said tube, and resilient means reacting between said latching bar and said piston when said latching bar is in said substantially vertical stored position whereby said latching bar is biased to rotated toward said substantially horizontal locking position.

2. A safety latch arrangement as set forth in claim 1 wherein said slotted hole and shaft means comprises a slotted hole in said latching bar and a shaft mounted substantially horizontally within said slot in said piston.

3. A safety latch arrangement as set forth in claim 2 wherein said transverse locking portion of said slotted hole has a portion extending above said transverse storing portion of said slot when said latching bar is in said substantially horizontal position for insuring that said transverse locking portion of said slot is maintained in engagement with said shaft when said latching bar moves out of said upper end of said tube.

4. A safety latch arrangement as set forth in claim 1 wherein said resilient means comprises a spring reacting between said piston and said latching bar.

5. A safety latch arrangement as set forth in claim 4 wherein said spring is mounted upon said piston within said slot above said slotted hole and shaft means, and said spring reacts against said storing end to urge it to rotate downwardly into said substantially horizontal position and to maintain said transverse locking position when it is stored within said slot.

6. A safety latch arrangement as set forth in claim 5 wherein said spring comprises a torsion spring, said torsion spring being mounted within said slot upon a pin, one leg of said spring reacting against said piston, and the other leg of said spring reacting against said storing end when it is in said substantially vertical stored position.

7. A safety latch arrangement as set forth in claim 1 wherein said latching bar is shaped to dispose its center of gravity in a direction which helps said resilient means bias said latching bar to rotate from said substantially vertical stored position to said substantially horizontal locking position.

8. A safety latch arrangement as set forth in claim 1 wherein said latching bar comprises a boss including an elongated slotted hole, said storing end extending a substantial distance from one side of said boss substantially parallel to said slotted hole, and said releasing end extending a shorter distance from the opposite end of said boss in substantial alignment with said storing end.

9. A safety latch arrangement as set forth in claim 1 wherein said storing and releasing ends are disposed substantially adjacent the lower portion of said latching bar when it is in said substantially horizontal position.

10. A safety latch arrangement as set forth in claim 1 wherein said means arresting the downward rotation of said storing end of said latching bar comprises a lower surface of said slot in said piston.

References Cited in the file of this patent
UNITED STATES PATENTS

| | | |
|---|---|---|
| 2,608,381 | Pelouch | Aug. 26, 1952 |
| 2,956,643 | Halstead | Oct. 18, 1960 |
| 2,956,644 | Green | Oct. 18, 1960 |
| 3,013,635 | Racely | Dec. 19, 1961 |